No. 811,716. PATENTED FEB. 6, 1906.
W. F. HAMPY.
MACHINE FOR SHARPENING DISKS.
APPLICATION FILED FEB. 2, 1905.
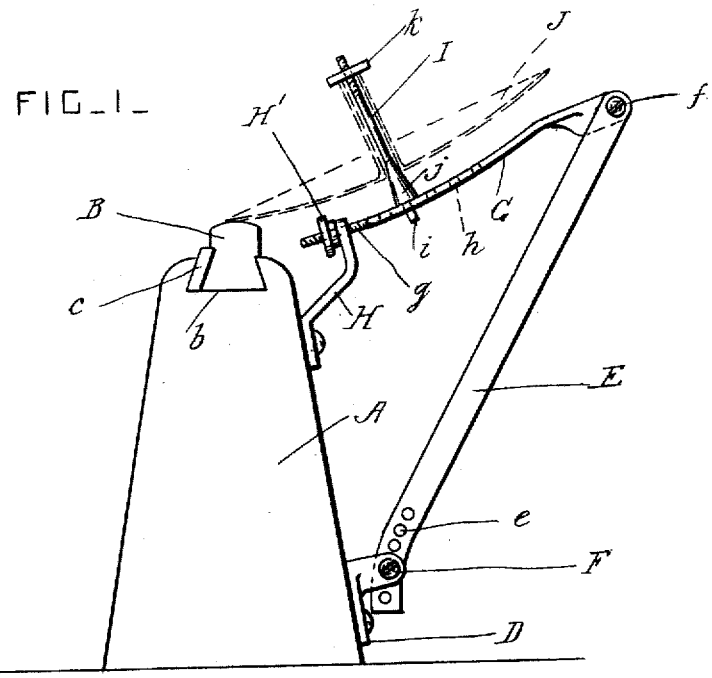
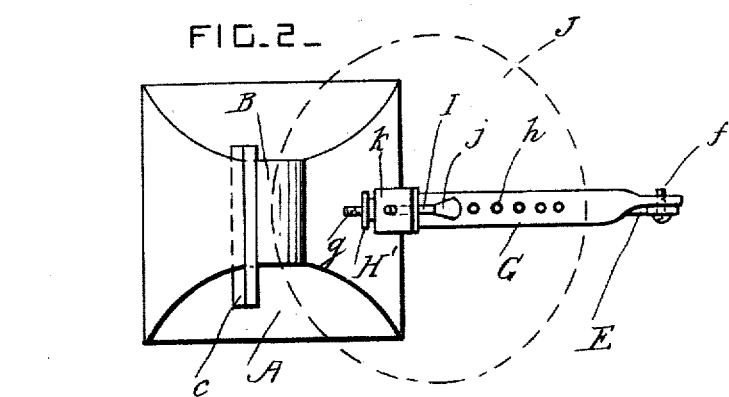
WITNESSES:
J. Sprigg Poole
Robt. A. Cissel
INVENTOR
William F. Hampy
BY Herbert W. Jenner
Attorney

UNITED STATES PATENT OFFICE.

WILLIAM F. HAMPY, OF BUCKLIN, KANSAS.

MACHINE FOR SHARPENING DISKS.

No. 811,716.   Specification of Letters Patent.   Patented Feb. 6, 1906.

Application filed February 2, 1905. Serial No. 243,870.

*To all whom it may concern:*

Be it known that I, WILLIAM F. HAMPY, a citizen of the United States, residing at Bucklin, in the county of Ford and State of Kansas, have invented certain new and useful Improvements in Machines for Sharpening Disks; and I do hereby declare the following to be a full, clear, and exact description of the invention, such as will enable others skilled in the art to which it appertains to make and use the same.

This invention relates to devices used for sharpening the disks of disk plows and other implements; and it consists in the novel construction and combination of the parts hereinafter fully described and claimed.

In the drawings, Figure 1 is a side view of the devices. Fig. 2 is a plan view of the same.

A is an anvil-block of any approved form and construction, and B is a removable block which is secured in a groove $b$ at the top of the anvil-block by means of a wedge $c$ or in any other approved manner.

D is a bracket secured to the lower part of the anvil-block by any approved fastening devices.

E is an arm provided in its lower end portion with a series of holes $e$. F is a pivot which engages with any of the said holes and with the said bracket, so that the arm is pivotally and adjustably connected with the bracket.

G is a curved arm which is pivoted to the upper end portion of the arm E by a pivot-pin $f$. The other end portion of the arm G is provided with a screw-thread $g$, which is slidable in a hole in a bracket H, which is secured to the upper part of the anvil-block by any approved fastening devices. The screw-thread $g$ is provided with a nut H', so that the exact position of the two arms can be regulated and the arms held in position. The curved arm G is also provided with a series of holes $h$.

I is a pivot-pin the lower end portion $i$ of which is free to revolve in any one of the holes $h$. This pivot-pin is provided with a conical portion $j$, and it has a nut $k$ screwed on its upper end portion.

J is a disk which is shown in dotted lines and which is a disk of the kind used on disk plows. This disk is secured on the pivot-pin I by means of the nut and the conical portion, and the edge of the disk is arranged to rest on the block B.

The devices can be arranged and adjusted to support disks of all sizes and with various degrees of concavity. The upper end of the arm E projects above the level of the top of the anvil, and the arm G is inclined downwardly from the pin $f$ toward the anvil. The disk is supported with its concave side uppermost, it being very desirable that it should be sharpened to the greatest extent upon its concave side. The disk is sharpened by hammering its edge which rests on the block. The hammering is preferably effected by means of a trip-hammer of any approved construction; but a hand-hammer, steam-hammer, or any other similar tool may be used in carrying out this invention. When the devices are not required in use, they may be readily detached from the anvil-block.

What I claim is—

The combination, with an anvil, and upper and lower brackets H and D secured thereto; of a main arm having its lower end pivoted to the lower bracket D and having its upper end arranged above the level of the top of the anvil, a brace-arm pivoted at one end to the upper end of the said main arm and having its other end slidable in the upper bracket H and provided with a nut, and a pin projecting from the middle part of the said brace-arm and adapted to support the disks with their concave sides uppermost.

In testimony whereof I have affixed my signature in the presence of two witnesses.

WILLIAM F. HAMPY.

Witnesses:
CHAS. ROBINSON,
A. W. PADGITT.